United States Patent
Damen

(10) Patent No.: US 11,785,013 B2
(45) Date of Patent: Oct. 10, 2023

(54) APPLICATION PROGRAM ACCESS CONTROL

(71) Applicant: Telefonaktiebolaget LM Ericsson (publ), Stockholm (SE)

(72) Inventor: Mark Damen, Tilburg (NL)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 419 days.

(21) Appl. No.: 17/053,292

(22) PCT Filed: May 18, 2018

(86) PCT No.: PCT/EP2018/063101
§ 371 (c)(1),
(2) Date: Nov. 5, 2020

(87) PCT Pub. No.: WO2019/219205
PCT Pub. Date: Nov. 21, 2019

(65) Prior Publication Data
US 2021/0243195 A1    Aug. 5, 2021

(51) Int. Cl.
*H04L 9/40* (2022.01)

(52) U.S. Cl.
CPC ........ *H04L 63/102* (2013.01); *H04L 63/0853* (2013.01)

(58) Field of Classification Search
CPC .......................... H04L 63/0853; H04L 63/102
(Continued)

(56) References Cited

U.S. PATENT DOCUMENTS 5,736,932 A    4/1998   Bulfer et al.
9,270,660 B2 *  2/2016   Smith .................. H04W 12/08
(Continued)

FOREIGN PATENT DOCUMENTS

CN    103619020 A    3/2014
CN    103929310 A    7/2014
(Continued)

OTHER PUBLICATIONS

Xi, et al. "Implementation of a Dynamic Identity Authentication System Based on Mobile Phone Token"; Wenzhou, China, Oct. 19, 2010, consisting of 5 pages.
(Continued)

*Primary Examiner* — Amare F Tabor
*Assistant Examiner* — Mahabub S Ahmed
(74) *Attorney, Agent, or Firm* — Christopher & Weisberg, P.A.

(57) ABSTRACT

There is provided a method of operating a node of a network. A first token generated by a device having an application program stored therein is received from the device. The first token is generated by the device in response to a request from a user to access the application program. A second token input by the user at a mobile terminal of a mobile network is received. The second token is input in response to a request for the user to input the first token. It is decided whether to allow the user access to the application program stored in the device based on a verification of whether the second token matches the first token and whether the user has a subscription for the application program. An indication of the decision whether to allow the user access to the application program is transmitted to the device.

20 Claims, 13 Drawing Sheets

(58) Field of Classification Search
USPC .......................................................... 726/9
See application file for complete search history.

(56) References Cited

U.S. PATENT DOCUMENTS

| | | | | |
|---|---|---|---|---|
| 9,374,356 | B2* | 6/2016 | Sondhi | H04L 63/20 |
| 9,397,980 | B1* | 7/2016 | Chen | G06F 21/33 |
| 9,967,251 | B1* | 5/2018 | Triandopoulos | H04L 63/0838 |
| 10,104,057 | B2* | 10/2018 | Gupta | G06F 21/34 |
| 10,148,637 | B2* | 12/2018 | Taralika | H04L 63/08 |
| 10,158,650 | B1* | 12/2018 | Hadiaris | G06F 21/64 |
| 10,460,312 | B1* | 10/2019 | Kurani | G06Q 20/32 |
| 10,659,454 | B2* | 5/2020 | Cao | H04L 63/10 |
| 2002/0177433 | A1* | 11/2002 | Bravo | H04M 3/382 455/410 |
| 2008/0216153 | A1* | 9/2008 | Aaltonen | H04L 63/083 726/3 |
| 2010/0128714 | A1* | 5/2010 | Kim | H04L 51/48 370/352 |
| 2010/0327054 | A1* | 12/2010 | Hammad | G06F 21/34 235/375 |
| 2011/0173684 | A1* | 7/2011 | Hurry | G06F 21/33 726/6 |
| 2011/0185420 | A1* | 7/2011 | Lee | G06F 21/31 726/22 |
| 2014/0032723 | A1* | 1/2014 | Nema | G06Q 10/00 709/220 |
| 2014/0236846 | A1* | 8/2014 | Melika | H04W 4/50 705/310 |
| 2014/0282990 | A1* | 9/2014 | Engelhart | H04L 67/02 726/9 |
| 2014/0349692 | A1* | 11/2014 | Zhou | H04M 1/72439 455/466 |
| 2014/0359289 | A1* | 12/2014 | Camenisch | H04W 12/02 713/168 |
| 2015/0089617 | A1* | 3/2015 | Sondhi | H04L 63/08 726/8 |
| 2015/0089623 | A1* | 3/2015 | Sondhi | H04L 63/205 726/9 |
| 2015/0172283 | A1 | 6/2015 | Omnes et al. | |
| 2015/0215312 | A1* | 7/2015 | Cesnik | H04N 21/44008 726/9 |
| 2015/0254659 | A1* | 9/2015 | Kulkarni | G06Q 20/325 705/44 |
| 2015/0281225 | A1* | 10/2015 | Schoen | H04L 63/08 726/9 |
| 2015/0350208 | A1* | 12/2015 | Bayramkul | G06F 21/42 726/9 |
| 2016/0028737 | A1* | 1/2016 | Srinivasan | H04L 63/0807 726/4 |
| 2016/0225004 | A1* | 8/2016 | Cohen | G06Q 30/0207 |
| 2016/0262021 | A1* | 9/2016 | Lee | H04W 12/06 |
| 2016/0286400 | A1* | 9/2016 | Pal | H04W 12/086 |
| 2016/0366122 | A1* | 12/2016 | Rykowski | G06F 21/41 |
| 2017/0078292 | A1* | 3/2017 | Quach | H04L 63/0853 |
| 2017/0142090 | A1* | 5/2017 | Mahaffey | H04L 9/0643 |
| 2017/0163617 | A1* | 6/2017 | Laxminarayanan | G06Q 20/3821 |
| 2017/0270524 | A1* | 9/2017 | Kim | G06Q 20/356 |
| 2018/0091565 | A1* | 3/2018 | Arsenault | H04L 67/02 |
| 2018/0227128 | A1* | 8/2018 | Church | H04L 9/3247 |
| 2018/0337925 | A1* | 11/2018 | Wallace | H04L 9/3234 |
| 2019/0044943 | A1* | 2/2019 | Kim | H04L 9/08 |
| 2019/0318122 | A1* | 10/2019 | Hockey | H04L 63/0853 |
| 2019/0386981 | A1* | 12/2019 | Ramesh Kumar | H04L 9/3228 |
| 2020/0204542 | A1* | 6/2020 | Nair | G06F 21/335 |
| 2022/0198436 | A1* | 6/2022 | Xu | G06Q 20/3276 |

FOREIGN PATENT DOCUMENTS

| | | |
|---|---|---|
| CN | 104202162 A | 12/2014 |
| CN | 105072080 A | 11/2015 |
| CN | 105791262 A | 7/2016 |
| CN | 105992204 A | 10/2016 |
| EP | 0817518 A2 | 1/1998 |
| WO | 2012045908 A1 | 4/2012 |
| WO | 2014175642 A1 | 10/2014 |
| WO | 0219593 A2 | 3/2022 |

OTHER PUBLICATIONS

Yang et al. "Design and Implementation of Unified User Information Management Service Framework"; Beijing Universityof Posts and Telecommunications; Mar. 5, 2015, consisting of 92 pages.
International Search Report and Written Opinion dated Feb. 5, 2019 for International Application No. PCT/EP2018/063101 filed on May 18, 2018, consisting of 10-pages.
Chinese Office Action and English Summary dated Sep. 26, 2022 for Application No. 201880093572.5, consisting of 9 pages.
Chinese Office Action and English Summary dated Feb. 27, 2023 for Application No. 201880093572.5, consisting of 13 pages.
Chinese Office Action and English Summary dated Jun. 29, 2023 for Application No. 201880093572.5, consisting of 15 pages.
Zhao et al. "E-Commerce Security" Beijing Institute of Technology, Oct. 31, 2016, consisting of 3 pages.

* cited by examiner

APPLICATION PROGRAM ACCESS CONTROL

CROSS-REFERENCE TO RELATED APPLICATION

This application is a Submission Under 35 U.S.C. § 371 for U.S. National Stage Patent Application of International Application Number: PCT/EP2018/063101, filed May 18, 2020 entitled "APPLICATION PROGRAM ACCESS CONTROL," the entirety of which is incorporated herein by reference.

TECHNICAL FIELD

The present idea relates to a node of a network and a method of operating the node for allowing access to an application program.

BACKGROUND

There currently exist many types of application programs (or "applications" or "apps"). Some examples of application programs include web applications, mobile applications, communication applications, database applications, word processing applications, drawing applications, and image editing applications. The demand for application programs is ever increasing and, as the application programs often require access to data and also allow the storage of data, it is important that the application programs are secure. As such, most application programs require a user to login in order to access the application program. There are currently various approaches by which users can login to application programs to access and store data in a secure way. These approaches involve techniques to check that a user is authenticated and authorized to access and/or store data through the application program.

In the simplest of these approaches, a username and password are used together by a user to login to an application program in a secure way. However, a rise in digital crime has meant that there is a growing need for more secure approaches for allowing accessing application programs. An example of a more secure approach is one that involves multi-factor authentication (for example, two-factor authentication). Multi-factor authentication requires, not only a username and password to be used in the login procedure, but also a further piece of information that the user knows or is able to retrieve. The further piece of information is usually a one-time token, such as a one-time passcode (for example, a random verification code) or one-time password (OTP). In some cases, a mobile terminal is used to retrieve the further piece of information. For example, an application program may be used on a mobile terminal to generate a one-time token, which may then be presented directly to the user or sent to the user via a short message service (SMS). The mobile terminal used in the authentication and authorization procedure is usually a mobile phone or a dedicated mobile authentication device (such as a random reader).

Therefore, some authentication and authorization procedures exist that combine the security of strong two-factor authentication with the convenience, simplicity and ease of use of one-time passcodes. However, while these existing procedures may provide improved security, there are still various drawbacks with associated with them. One of the drawbacks is that multiple authentication steps are required as the user must first enter a username and password and then also a further piece of information. The existing procedures can thus be complex or extensive and thus inconvenient and time consuming for the user. Moreover, the fact that a username and password is still required can cause the user difficulties as they are required to remember and also update their usernames and password to maintain security. The usernames and passwords also have a tendency to be leaked or to be weak, which means that a security breach is all the more viable.

Also, in some existing procedures, an internet connection is required, which may not always be available or secure. The procedures that require an internet connection or that involve a short message service (SMS) can thus often fail while the user is roaming. The existing procedures are also limited to a user, rather than to a user and mobile terminal combination. Moreover, in multi-factor authentication procedures, a one-time token or a device that is capable of generating a one-time token always needs to be at hand. In some instances, additional software (e.g. a mobile application) is needed to generate one-time tokens.

There is thus a need for an improved way in which to allow access to an application program, which overcomes at least some of these drawbacks.

SUMMARY

It is an object to obviate or eliminate at least some of the above-described drawbacks associated with existing approaches and thus provide an improved way in which to allow access to an application program.

Therefore, according to an aspect, there is provided a method of operating a node of a network. The method comprises receiving, from a device having an application program stored therein, a first token generated by the device in response to a request from a user to access the application program and receiving a second token input by the user at a mobile terminal of a mobile network in response to a request for the user to input the first token generated by the device. The method also comprises deciding whether to allow the user access to the application program stored in the device based on a verification of whether the second token matches the first token and whether the user has a subscription for the application program. The method also comprises transmitting, to the device, an indication of the decision whether to allow the user access to the application program.

The idea thus provides an improved way in which to allow access to an application program. The idea advantageously provides a secure authorisation system by making use of the security of the mobile network. Effectively, the mobile network can be used as a secure access server to decide whether to allow access to the application program. Through use of the mobile network, the idea provides both authentication (by way of the verification) and authorization (by way of the decision on whether to allow access based on the verification). In this way, access to the application program will be limited to authenticated users, which improves the security of data used in or stored by the application program.

Also, the user is able to gain access to application programs to which the user has a subscription using a mobile terminal in a simple and efficient manner, since the user need only provide the token generated by the device having the application program stored therein. In this way, the burden on the user is reduced as no username or password is required. Also, the idea provides more convenience for the user as no internet connection is required and thus the idea can be used anywhere at any time (e.g. while the user is roaming). Moreover, it is not necessary for the user to install additional software or applications.

In some embodiments, the method may comprise, if the second token matches the first token and the user has a subscription for the application program, deciding to allow the user access to the application program. In some embodiments, the method may comprise, if the second token does not match the first token and/or the user does not have a subscription for the application program, deciding to refuse the user access to the application program. In this way, it is possible to securely control access to the application program. In this way, it is possible to accurately and reliably provide access to a particular application program to only those users that are authorised to have such access to that particular application program. Thus, data used in or stored by the application program is more secure. Moreover, as access to the application program is allowed through the use of the mobile network as a secure access server, this makes it possible for logging out of the application program to also be performed via the mobile network. As such, the user can log out of a particular application program or all application programs irrespective of their location.

In some embodiments, the verification of whether the user has a subscription for the application program may comprise verifying, with a database operable to store or retrieve subscription data for mobile terminals, whether the user has a subscription for the application program. In this way, the integrity of the mobile network can be advantageously used for the verification. For example, by making use of a subscription database (which is operable to store or retrieve subscription data for mobile terminals) for the verification, it is possible to securely and reliably check that a user is allowed to access an application program. Also, the use of the subscription database means that it is possible for different levels of authorisation to be provided to users in respect of certain application programs and/or for temporary guest accounts (e.g. with basic rights) to be given to users for access to an application program, all in a secure way.

In some embodiments, the method may further comprise receiving a mobile number for the mobile terminal at which the second token is input by the user. In some embodiments, the verification of whether the user has a subscription for the application program may be based on the received mobile number for the mobile terminal.

In some embodiments, the method may further comprise receiving any one or more of an identity of the application program and an identity of a session running on the application program, wherein the request from the user may be for access to the session running on the application program. In this way, if a user is allowed access to an application program, the user can later be logged out of the application program and/or stop a session running on the application program without the user being behind a device (e.g. a computer or internet terminal).

In some embodiments, the method may further comprise storing, in a database operable to store or retrieve subscription data for mobile terminals, any one or more of the first token, the identity of the application program and the identity of a session running on the application program.

In some embodiments, the second token may be received via the mobile network and/or an application server.

In some embodiments, the second token may be input by the user at the mobile terminal while a predefined number is dialled at the mobile terminal.

In some embodiments, the first token may be received as a hypertext transfer protocol request.

In some embodiments, the first token may be randomly generated by the device. In this way, security can be enhanced further.

According to another aspect of the idea, there is provided a node of a network. The node comprises processing circuitry operable to receive, from a device having an application program stored therein, a first token generated by the device in response to a request from a user to access the application program and receive a second token input by the user at a mobile terminal of a mobile network in response to a request for the user to input the first token generated by the device. The processing circuitry is also operable to decide whether to allow the user access to the application program stored in the device based on a verification of whether the second token matches the first token and whether the user has a subscription for the application program. The processing circuitry is also operable to transmit, to the device, an indication of the decision whether to allow the user access to the application program. This aspect thus provides the advantages discussed earlier in respect of the method of operating the node of the network.

According to another aspect of the idea, there is provided a method of operating a device having application program stored therein. The method comprises generating a first token in response to a request from a user to access the application program and transmitting the first token to a node of a network for use by the node in deciding whether to allow the user access to the application program. The method also comprises receiving, from the node, an indication of the decision whether to allow the user access to the application program. This aspect thus provides the advantages discussed earlier in respect of the method of operating the node of the network.

According to another aspect of the idea, there is provided a device having an application program stored therein. The device comprises processing circuitry operable to generate a first token in response to a request from a user to access the application program. The processing circuitry is also operable to transmit the first token to a node of a network for use by the node in deciding whether to allow the user access to the application program and receive, from the node, an indication of the decision whether to allow the user access to the application program. This aspect thus provides the advantages discussed earlier in respect of the method of operating the node of the network.

According to another aspect of the idea, there is provided a method of operating a mobile terminal of a mobile network. The method comprises receiving a second token input by a user at the mobile terminal in response to a request for the user to input a first token generated by a device having an application program stored therein and transmitting the received second token to a node of a network for use in by the node in deciding whether to allow the user access to the application program. This aspect thus provides the advantages discussed earlier in respect of the method of operating the node of the network.

In some embodiments, the second token may be input by the user at the mobile terminal while a predefined number is being dialled at the mobile terminal. In this way, access to the application program is faster and more convenient. Moreover, any risk of an incorrect number being provided is eliminated as the number to dial is predefined.

In some embodiments, the method may comprise transmitting the received second token to the node of the network via the mobile network and/or an application server.

According to another aspect of the idea, there is provided a mobile terminal of a mobile network. The mobile terminal comprises processing circuitry operable to receive a second token input by a user at the mobile terminal in response to a request for the user to input a first token generated by a device having an application program stored therein and transmit the received second token to a node of a network for use by the node in deciding whether to allow the user access to the application program. This aspect thus provides the advantages discussed earlier in respect of the method of operating the node of the network.

According to another aspect of the idea, there is provided a method of operating an application server of a network. The method comprises receiving, from a mobile terminal of a mobile network, a second token input by a user at the mobile terminal, wherein the second token is input by the user in response to a request for the user to input a first token generated by a device having an application program stored therein. The method also comprises transmitting the second token to a node of a network for use by the node in deciding whether to allow the user access to the application program. This aspect thus provides the advantages discussed earlier in respect of the method of operating the node of the network.

In some embodiments, the method may further comprise receiving a mobile number for the mobile terminal at which the second token is input by the user and transmitting the mobile number for the mobile terminal to the node of the network. In some embodiments, the mobile number for the mobile terminal may be transmitted to the node of the network for use in the verification of whether the user has a subscription for the application program.

In some embodiments, the first token may be transmitted as a hypertext transfer protocol request. In this way, no proprietary protocols or vendor specific details need to be acquired, which allows faster access to application programs in a simple manner.

According to another aspect of the idea, there is provided an application server of a network. The application server comprises processing circuitry operable to receive, from a mobile terminal of a mobile network, a second token input by a user at the mobile terminal, wherein the second token is input by the user in response to a request for the user to input a first token generated by a device having an application program stored therein. The processing circuitry is also operable to transmit the second token to a node of a network for use by the node in deciding whether to allow access to the application program. This aspect thus provides the advantages discussed earlier in respect of the method of operating the node of the network.

According to another aspect of the idea, there is provided a network comprising any one or more of the node as described above, the application program as described above, the mobile terminal as described above, the mobile network, and the application server as described above. This aspect thus provides the advantages discussed earlier in respect of the method of operating the node of the network.

According to another aspect of the idea, there is provided a computer program product comprising a carrier containing instructions for causing processing circuitry to perform the method described earlier. This aspect thus provides the advantages discussed earlier in respect of the method of operating the node of the network.

Therefore, there is provided an improved way in which to allow access to an application program.

BRIEF DESCRIPTION OF THE DRAWINGS

For a better understanding of the idea, and to show how it may be put into effect, reference will now be made, by way of example, to the accompanying drawings, in which.

DETAILED DESCRIPTION

There is described herein an improved way in which to allow access to an application program. Herein, an application program may be any type of application program. For example, an application program can comprise any program operable to perform a function for a user of the application program. An application program may also be referred to in the art as an "application" or an "app". Examples of an application program include, but are not limited to, a web (or internet) application program, a mobile application program, a communication application program, a database application program, a word processing application program, a drawing application program, an image editing application program, or any other application program.

Figure 1:
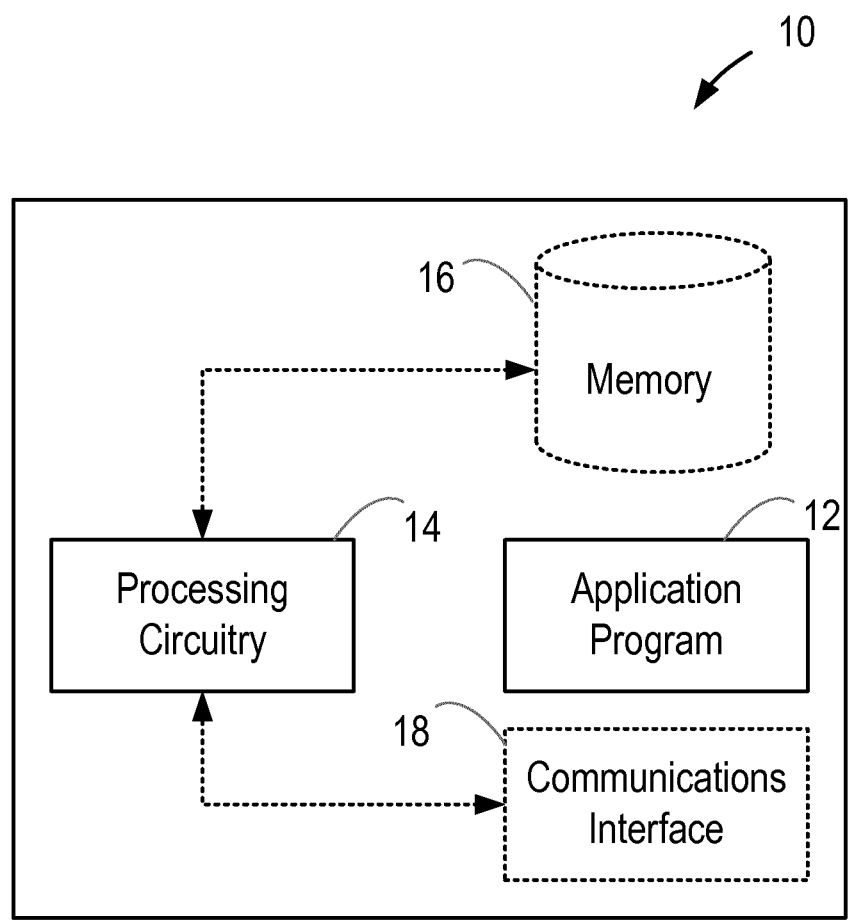
FIG. 1 is a block diagram illustrating an embodiment of a device.

FIG. 1 illustrates a device 10 in accordance with an embodiment. As illustrated in FIG. 1, the device 10 has an application program 12 stored therein. The device 10 may be any device having an application program 12 stored therein. Examples of the device 10 include, but are not limited to, a computer, a tablet, a smart phone, or any other device 10 having an application program 12 stored therein. The application program 12 stored in the device 10 can be in the form of software that can be downloaded onto the device 10 from a remote location (e.g. an application store accessible via the Internet) or pre-installed on the device 10 (e.g. during manufacture of the device 10 or during an initial set up or configuration process for the device 10). Alternatively, the functionality of the application program 12 can be implemented in hardware, or as a mixture of hardware and software/firmware. The application program 12 may alternatively be referred to as a software instance, a virtual appliance, a network function, a virtual node, a virtual network function, etc. In effect, the device 10 is a virtualization of environment for the application program 12, which provides hardware (e.g. processing circuitry and optionally a memory) to run the application.

As illustrated in FIG. 1, the device 10 comprises processing circuitry (or logic) 14. The processing circuitry 14 of the device 10 controls the operation of the device 10 and can implement the method described herein in relation to the device 10. The processing circuitry 14 of the device 10 can comprise one or more processors, processing units, multicore processors or modules, configured or programmed to control the operation of the device 10 in the manner described herein. In particular implementations, the processing circuitry 14 of the device 10 can comprise a plurality of software and/or hardware modules that are each configured to perform, or are for performing, individual or multiple steps of the method disclosed herein in relation to the device 10.

Briefly, the processing circuitry 14 of the device is operable to generate a first token in response to a request from a user to access the application program 12, transmit the first token to a node of a network for use by the node in deciding whether to allow the user access to the application program 12 and receive, from the node, an indication of the decision whether to allow the user access to the application program 12. Herein, the first token can be a code according to some embodiments. In some embodiments, the code may comprise one or more words, one or more letters, one or more digits, and/or one or more symbols.

As illustrated in FIG. 1, in some embodiments, the device 10 may optionally comprise a memory 16. The memory 16 of the device 10 can be connected to the processing circuitry 14 of the device 10. In some embodiments, the memory 16 of the device 10 may be configured to store program code or instructions that can be executed by the processing circuitry 14 of the device 10 to perform the method described herein in relation to the device 10. Alternatively or in addition, the memory 16 of the device 10 can be configured to store any requests, tokens, information, data, signals, or similar, that are described herein. The processing circuitry 14 of the device 10 may be configured to control the memory 16 of the device 10 to store any requests, tokens, information, data, signals, or similar, that are described herein.

The memory 16 of the device 10 can comprise a volatile memory or a non-volatile memory. In some embodiments, the memory 16 of the device 10 may comprise a non-transitory media. Examples of the memory 16 of the device 10 include, but are not limited to, a random access memory (RAM), a read only memory (ROM), a mass storage media such as a hard disk, a removable storage media such as a compact disk (CD) or a digital video disk (DVD), and/or any other memory.

In some embodiments, as illustrated in FIG. 1, the device 10 may optionally comprise a communications interface 18. The communications interface 18 of the device 10 can be connected to the processing circuitry 14 of the device 10. The communications interface 18 of the device 10 may be operable to communicate with other nodes (such as any one or more of the node of the network, one or more databases, one or more mobile terminals, one or more application servers, or any other nodes, or any combination of other nodes). For example, the communications interface 18 of the device 10 can be configured to transmit to and/or receive from other nodes requests, tokens, information, data, signals, or similar. The processing circuitry 14 of the device 10 may be configured to control the communications interface 18 of the device 10 to transmit to and/or receive from other nodes requests, resources, information, data, signals, or similar.

It will be appreciated that FIG. 1 only shows the components required to illustrate an embodiment of the device 10 and, in a practical implementation, the device 10 may comprise additional or alternative components to those shown.

Figure 2:
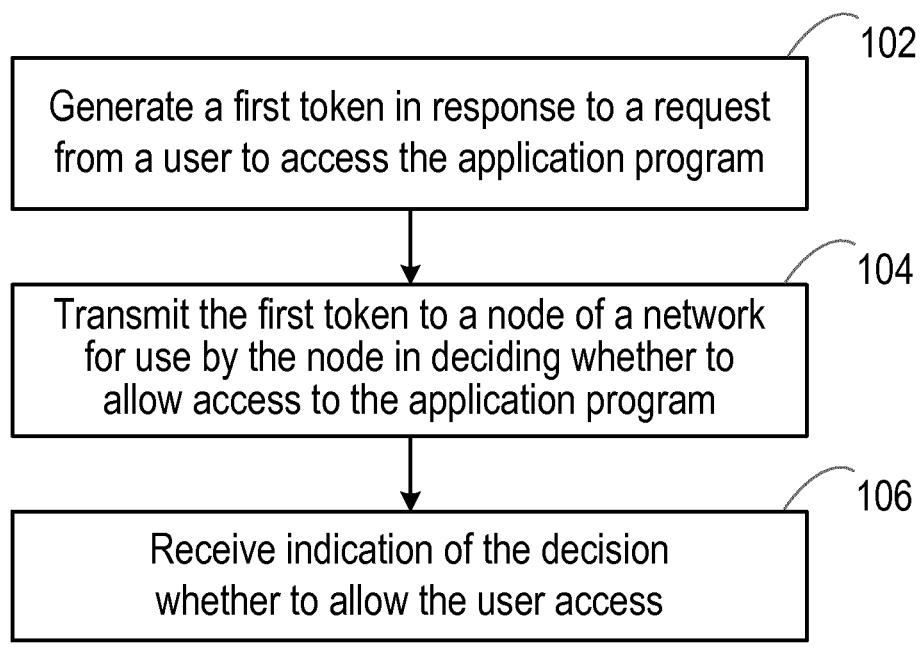
FIG. 2 is a flowchart illustrating a method of operating a device in accordance with an embodiment.

FIG. 2 is a flowchart illustrating a method of operating the device 10 having the application program 12 stored therein in accordance with an embodiment. The method of FIG. 2 can be performed by or under the control of the processing circuitry 14 of the device 10. With reference to FIG. 2, at block 102, a first token is generated in response to a request from a user to access the application program 12. In some embodiments, the first token may be randomly generated.

At block 104, the first token is transmitted to a node of a network for use by the node in deciding whether to allow the user access to the application program 12. In some embodiments, the first token may be transmitted as a hypertext transfer protocol (HTTP) request. In some embodiments, one or more of an identity of the application program 12 and an identity of a session running on the application program 12 may also be transmitted to the node of the network.

At block 106, an indication of the decision whether to allow the user access to the application program 12 is received from the node. The indication may be an indication of a decision to allow the user access to the application program 12. In this case, the device 10 may be operable to allow the user access to the application program 12. On the other hand, the indication may be an indication of a decision to refuse the user access to the application program 12. In this case, the device 10 may be operable to refuse the user access to the application program 12.

Figure 3:
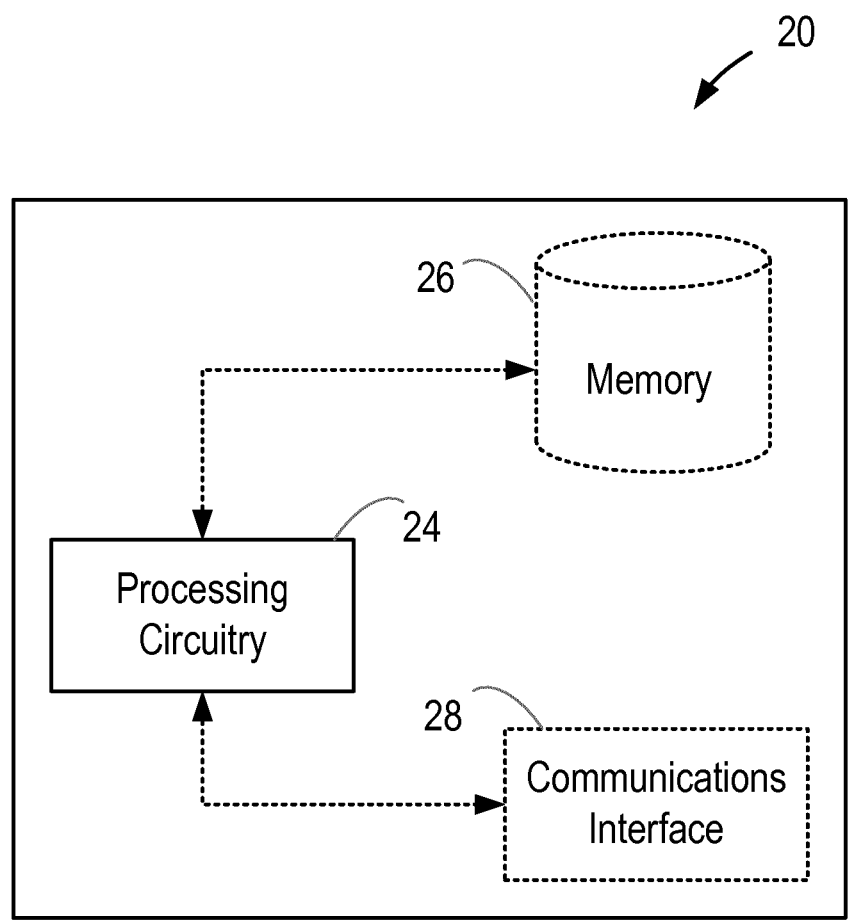
FIG. 3 is a block diagram illustrating an embodiment of a mobile terminal.

FIG. 3 illustrates a mobile terminal 20 of a mobile network in accordance with an embodiment. The mobile terminal 20 may be any type of mobile terminal. Examples of the mobile terminal include, but are not limited to, a mobile device (such as a mobile phone, a smart phone, a smart watch, a tablet, or any other mobile device), or any other mobile terminal.

As illustrated in FIG. 3, the mobile terminal 20 comprises processing circuitry (or logic) 24. The processing circuitry 24 of the mobile terminal 20 controls the operation of the mobile terminal 20 and can implement the method described herein in relation to the mobile terminal 20. The processing circuitry 24 of the mobile terminal 20 can comprise one or more processors, processing units, multicore processors or modules, configured or programmed to control the operation of the mobile terminal 20 in the manner described herein. In particular implementations, the processing circuitry 24 of the mobile terminal 20 can comprise a plurality of software and/or hardware modules that are each configured to perform, or are for performing, individual or multiple steps of the method disclosed herein in relation to the mobile terminal 20.

Briefly, the processing circuitry 24 of the mobile terminal 20 is operable to receive a second token input by a user at the mobile terminal 20 in response to a request for the user to input a first token generated by a device 10 having an application program 12 stored therein and transmit the received second token to a node of a network for use by the node in deciding whether to allow the user access to the application program 12. Herein, the second token may be a code according to some embodiments. In some embodiments, the code may comprise one or more words, one or more letters, one or more digits, and/or one or more symbols.

As illustrated in FIG. 3, in some embodiments, the mobile terminal 20 may optionally comprise a memory 26. The memory 26 of the mobile terminal 20 can be connected to the processing circuitry 24 of the mobile terminal 20. In some embodiments, the memory 26 of the mobile terminal 20 may be configured to store program code that can be executed by the processing circuitry 24 of the mobile terminal 20 to perform the method described herein in relation to the mobile terminal 20. Alternatively or in addition, the memory 26 of the mobile terminal 20 can be configured to store any requests, tokens, information, data, signals, or similar, that are described herein. The processing circuitry 24 of the mobile terminal 20 may be configured to control the memory 26 of the mobile terminal 20 to store any requests, tokens, information, data, signals, or similar, that are described herein.

The memory 26 of the mobile terminal 20 can comprise a volatile memory or a non-volatile memory. In some embodiments, the memory 26 of the mobile terminal 20 may comprise a non-transitory media. Examples of the memory 26 of the mobile terminal 20 include, but are not limited to, a random access memory (RAM), a read only memory (ROM), a mass storage media such as a hard disk, a removable storage media such as a compact disk (CD) or a digital video disk (DVD), and/or any other memory.

In some embodiments, as illustrated in FIG. 3, the mobile terminal 20 may optionally comprise a communications interface 28. The communications interface 28 of the mobile terminal 20 can be connected to the processing circuitry 24 of the mobile terminal 20. The communications interface 28 of the mobile terminal 20 may be operable to communicate with other nodes (such as any one or more of the device 10 having the application program 12 stored therein, the node of the network, one or more databases, one or more other mobile terminals, one or more application servers, or any other nodes, or any combination of other nodes). For example, the communications interface 28 of the mobile terminal 20 can be configured to transmit to and/or receive from other nodes requests, tokens, information, data, signals, or similar. The processing circuitry 24 of the mobile terminal 20 may be configured to control the communications interface 28 of the mobile terminal 20 to transmit to and/or receive from other nodes requests, resources, information, data, signals, or similar.

It will be appreciated that FIG. 3 only shows the components required to illustrate an embodiment of the mobile terminal 20 and, in a practical implementation, the mobile terminal 20 may comprise additional or alternative components to those shown.

Figure 4:
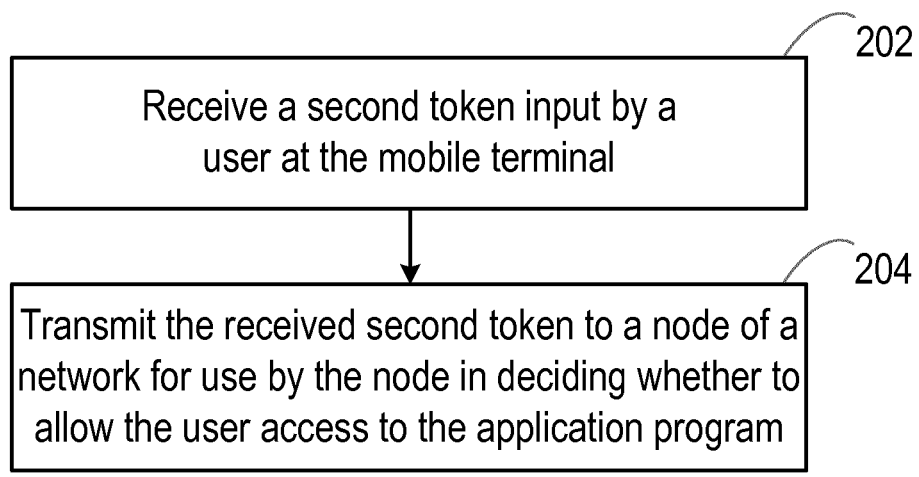
FIG. 4 is a flowchart illustrating a method of operating a mobile terminal in accordance with an embodiment.

FIG. 4 is a flow chart illustrating a method of operating the mobile terminal 20 of the mobile network in accordance with an embodiment. The method of FIG. 4 can be performed by or under the control of the processing circuitry 24 of the mobile terminal 20. With reference to FIG. 4, at block 202, a second token input by a user at the mobile terminal 20 is received. The second token is input by a user at the mobile terminal 20 in response to a request for the user to input a first token generated by a device 10 having an application program 12 stored therein. In some embodiments, the second token may be input by the user at the mobile terminal 20 while a predefined number is being dialled at the mobile terminal 20.

At block 204, the received second token is transmitted to a node of a network for use in by the node in deciding whether to allow the user access to the application program 12. The method of operating the mobile terminal 20 may comprise transmitting the received second token directly to the node of the network or indirectly to the node of the network. For example, in some embodiments, the method of operating the mobile terminal 20 may comprise transmitting the received second token via the mobile network and/or an application server.

Figure 5:
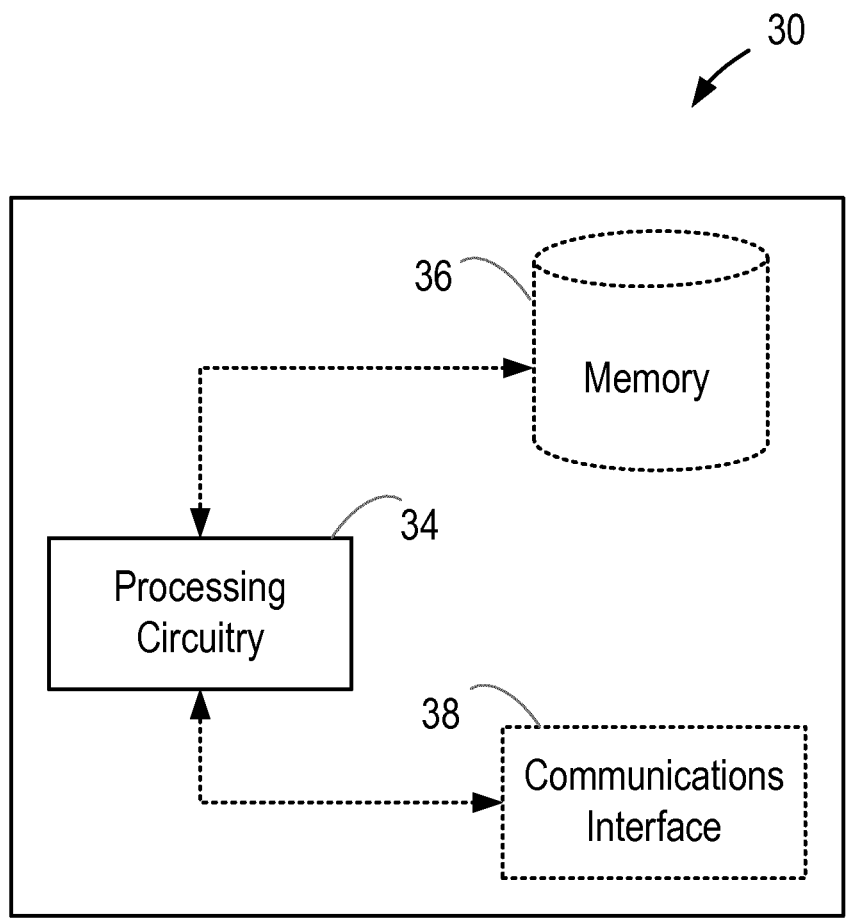
FIG. 5 is a block diagram illustrating an embodiment of an application server.

FIG. 5 illustrates an application server 30 of a network in accordance with an embodiment. As illustrated in FIG. 5, the application server 30 comprises processing circuitry (or logic) 34. The processing circuitry 34 of the application server 30 controls the operation of the application server 30 and can implement the method described herein in relation to the application server 30. The processing circuitry 34 of the application server 30 can comprise one or more processors, processing units, multicore processors or modules, configured or programmed to control the operation of the application server 30 in the manner described herein. In particular implementations, the processing circuitry 34 of the application server 30 can comprise a plurality of software and/or hardware modules that are each configured to perform, or are for performing, individual or multiple steps of the method disclosed herein in relation to the application server.

Briefly, the processing circuitry 34 of the application server 30 is operable to receive, from a mobile terminal 20 of a mobile network, a second token input by a user at the mobile terminal 20. The second token is input by the user in response to a request for the user to input a first token generated by a device 10 having an application program 12 stored therein. The first token is generated by the device 10 having the application program 12 stored therein in response to a request from a user to access the application program 12. The processing circuitry 34 of the application server 30 is also operable to transmit the second token to a node of a network for use by the node in deciding whether to allow access to the application program 12. The application server 30 can be provided in a mobile network (e.g. in a mobile telephony network) domain. The application server 30 can be operable to connect the mobile network domain to the information technology (IT) domain.

As illustrated in FIG. 5, in some embodiments, the application server 30 may optionally comprise a memory 36. The memory 36 of the application server 30 can be connected to the processing circuitry 34 of the application server 30. In some embodiments, the memory 36 of the application server 30 may be configured to store program code that can be executed by the processing circuitry 34 of the application server 30 to perform the method described herein in relation to the application server 30. Alternatively or in addition, the memory 36 of the application server 30 can be configured to store any requests, tokens, information, data, signals, or similar, that are described herein. The processing circuitry 34 of the application server 30 may be configured to control the memory 36 of the application server 30 to store any requests, tokens, information, data, signals, or similar, that are described herein.

The memory 36 of the application server 30 can comprise a volatile memory or a non-volatile memory. In some embodiments, the memory 36 of the application server 30 may comprise a non-transitory media. Examples of the memory 36 of the application server 30 include, but are not limited to, a random access memory (RAM), a read only memory (ROM), a mass storage media such as a hard disk, a removable storage media such as a compact disk (CD) or a digital video disk (DVD), and/or any other memory.

In some embodiments, as illustrated in FIG. 5, the application server 30 may optionally comprise a communications interface 38. The communications interface 38 of the application server 30 can be connected to the processing circuitry 34 of the application server 30. The communications interface 38 of the application server 30 may be operable to communicate with other nodes (such as any one or more of the device 10 having the application program 12 stored therein, the node of the network, one or more databases, one or more mobile terminals 20, one or more other application servers, or any other nodes, or any combination of other nodes). For example, the communications interface 38 of the application server 30 can be configured to transmit to and/or receive from other nodes requests, tokens, information, data, signals, or similar. The processing circuitry 34 of the application server 30 may be configured to control the communications interface 38 of the application server 30 to transmit to and/or receive from other nodes requests, resources, information, data, signals, or similar.

It will be appreciated that FIG. 5 only shows the components required to illustrate an embodiment of the application server 30 and, in a practical implementation, the application server 30 may comprise additional or alternative components to those shown.

Figure 6:
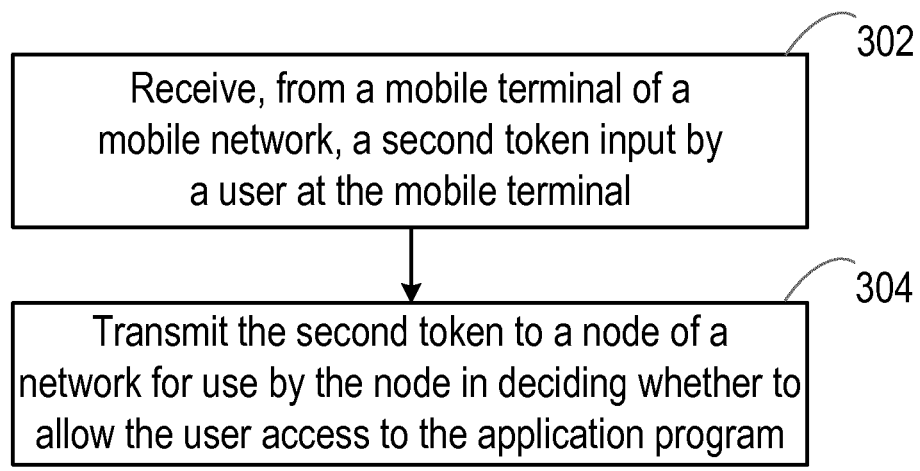
FIG. 6 is a flowchart illustrating a method of operating an application server in accordance with an embodiment.

FIG. 6 is a flowchart illustrating a method of operating the application server 30 in accordance with an embodiment. The method of FIG. 6 can be performed by or under the control of the processing circuitry 34 of the application server 30.

With reference to FIG. 6, at block 302, a second token input by a user at a mobile terminal 20 of a mobile network is received from the mobile terminal 20. As mentioned earlier, the second token is input by the user at the mobile terminal 20 in response to a request for the user to input a first token generated by a device 10 having an application program 12 stored therein. As also mentioned earlier, the first token is generated by the device 10 having the application program 12 stored therein in response to a request from a user to access the application program 12. At block 304, the second token is transmitted to a node of a network for use by the node in deciding whether to allow the user access to the application program 12.

In some embodiments, the method of operating the application server 30 may further comprise receiving a mobile number for the mobile terminal 20 at which the second token is input by the user. In these embodiments, the method of operating the application server 30 may also comprise transmitting the mobile number for the mobile terminal 20 to the node of the network. In some embodiments, the mobile number for the mobile terminal 20 is transmitted to the node of the network for use in the verification of whether the user has a subscription for the application program 12.

In some embodiments, the application server 30 can be operable to provide telecommunications services, such as real time charging, location and/or time based screening, and/or any other telecommunications service(s).

Figure 7:
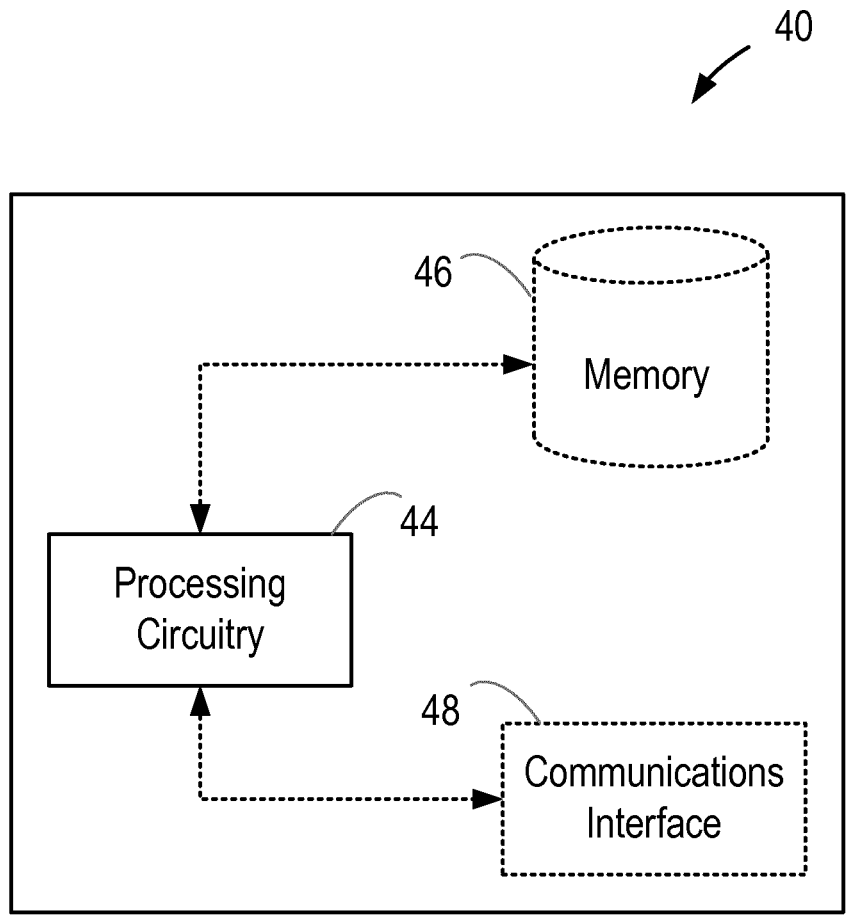
FIG. 7 is a block diagram illustrating an embodiment of a node.

FIG. 7 illustrates a node 40 of a network in accordance with an embodiment. As illustrated in FIG. 7, the node 40 comprises processing circuitry (or logic) 44. The processing circuitry 44 of the node 40 controls the operation of the node 40 and can implement the method described herein in relation to the node 40. The processing circuitry 44 of the node 40 can comprise one or more processors, processing units, multicore processors or modules, configured or programmed to control the operation of the node 40 in the manner described herein. In particular implementations, the processing circuitry 44 of the node 40 can comprise a plurality of software and/or hardware modules that are each configured to perform, or are for performing, individual or multiple steps of the method disclosed herein in relation to the node 40.

Briefly, the processing circuitry 44 of the node 40 is operable to receive, from a device 10 having an application program 12 stored therein, a first token generated by the device 10 in response to a request from a user to access the application program 12. The processing circuitry 44 of the node 40 is further operable to receive a second token input by the user at a mobile terminal 20 of a mobile network in response to a request for the user to input the first token generated by the device 10 having the application program 12 stored therein. The processing circuitry 44 of the node 40 is also operable to decide whether to allow the user access to the application program 12 stored in the device 10 based on a verification of whether the second token matches the first token and whether the user has a subscription for the application program 12. The processing circuitry 44 of the node 40 is further operable to transmit, to the device 10, an indication of the decision whether to allow the user access to the application program 12.

The node 40 can be provided in an information technology (IT) domain. The node 40 can be operable to connect the information technology (IT) domain to a mobile network (e.g. in a mobile telephony network) domain. Thus, in some embodiments, a node 40 in the information technology (IT) domain and an application server 30 in the mobile network domain can be used to connect the two domains.

As illustrated in FIG. 7, in some embodiments, the node 40 may optionally comprise a memory 46. The memory 46 of the node 40 can be connected to the processing circuitry 44 of the node 40. In some embodiments, the memory 46 of the node 40 may be configured to store program code that can be executed by the processing circuitry 44 of the node 40 to perform the method described herein in relation to the node 40. Alternatively or in addition, the memory 46 of the node 40 can be configured to store any requests, tokens, information, data, signals, or similar, that are described herein. The processing circuitry 44 of the node 40 may be configured to control the memory 46 of the node 40 to store any requests, tokens, information, data, signals, or similar, that are described herein.

The memory 46 of the node 40 can comprise a volatile memory or a non-volatile memory. In some embodiments, the memory 46 of the node 40 may comprise a non-transitory media. Examples of the memory 46 of the node 40 include, but are not limited to, a random access memory (RAM), a read only memory (ROM), a mass storage media such as a hard disk, a removable storage media such as a compact disk (CD) or a digital video disk (DVD), and/or any other memory.

In some embodiments, as illustrated in FIG. 7, the node 40 may optionally comprise a communications interface 48. The communications interface 48 of the node 40 can be connected to the processing circuitry 44 of the node 40. The communications interface 48 of the node 40 may be operable to communicate with other nodes (such as any one or more of the device 10 having the application program 12 stored therein, one or more databases, one or more mobile terminals, one or more application servers, or any other nodes, or any combination of other nodes). For example, the communications interface 48 of the node 40 can be configured to transmit to and/or receive from other nodes requests, tokens, information, data, signals, or similar. The processing circuitry 44 of the node 40 may be configured to control the communications interface 48 of the node 40 to transmit to and/or receive from other nodes requests, resources, information, data, signals, or similar.

It will be appreciated that FIG. 7 only shows the components required to illustrate an embodiment of the node 40 and, in a practical implementation, the node 40 may comprise additional or alternative components to those shown.

Figure 8:
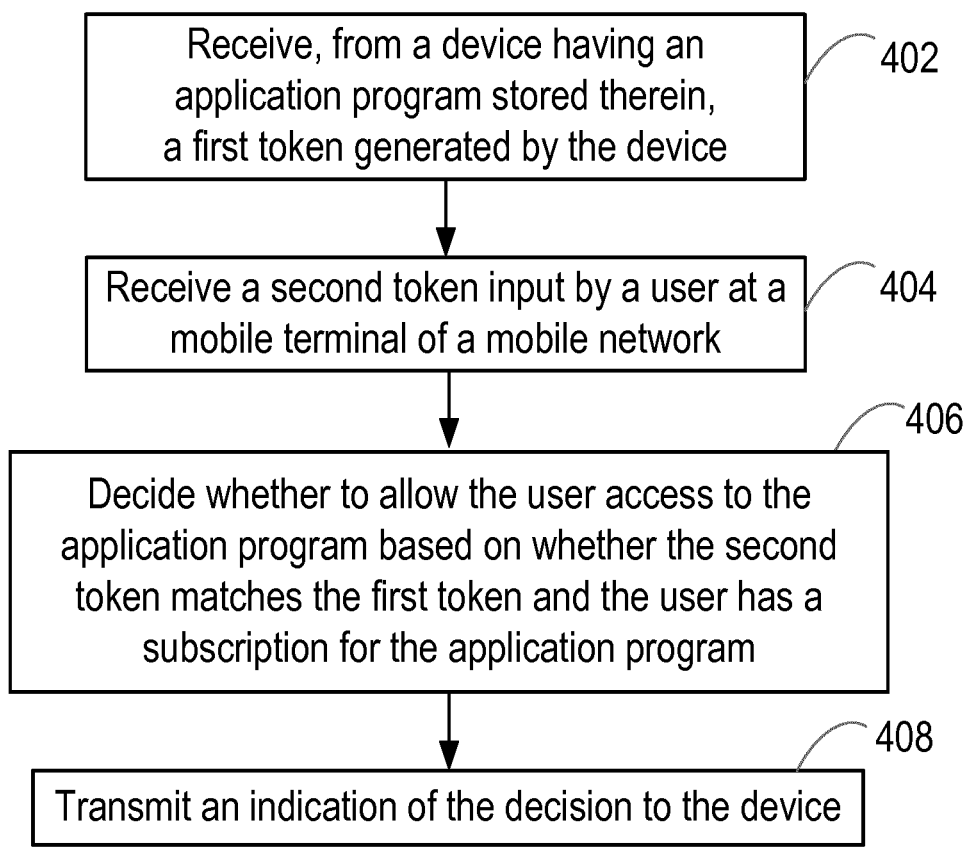
FIG. 8 is a flowchart illustrating a method of operating a node in accordance with an embodiment.

FIG. 8 is a flowchart illustrating a method of operating the node 40 in accordance with an embodiment. The method of FIG. 8 can be performed by or under the control of the processing circuitry 44 of the node 40.

With reference to FIG. 8, at block 402, a first token is received from a device 10 having an application program 12 stored therein. The first token is generated by the device 10 in response to a request from a user to access the application program 12. As mentioned earlier, in some embodiments, the first token may be randomly generated by the device 10 having the application program 12 stored therein. In some embodiments, the first token may be received as a hypertext transfer protocol (HTTP) request. Although not illustrated in FIG. 8, in some embodiments, the method can further comprise storing the received first token in a database that is operable to store or retrieve subscription data for mobile terminals.

At block 404, a second token input by the user at a mobile terminal 20 of a mobile network is received. The second token is input by the user at the mobile terminal 20 in response to a request for the user to input the first token generated by the device 10 having the application program 12 stored therein. According to some embodiments, the second token may be input by the user at the mobile terminal 20 while a predefined number is dialled at the mobile terminal 20. The second token can be received directly from the mobile terminal 20 or indirectly from the mobile terminal 20. For example, in some embodiments, the second token may be received from the mobile terminal 20 via the mobile network and/or an application server 30.

At block 406, it is decided whether to allow the user access to the application program 12 stored in the device 10 based on a verification of whether the second token matches the first token and whether the user has a subscription for the application program 12.

In some embodiments, it may initially be verified whether the second token matches the first token and subsequently whether the user has a subscription for the application program 12. In some of these embodiments, the verification of whether the user has a subscription for the application program 12 may only be performed if it is verified that the second token matches the first token. In a similar manner, in other embodiments, it may initially be verified whether the user has a subscription for the application program 12 and subsequently whether the second token matches the first token. In some of these embodiments, the verification of whether the second token matches the first token may only be performed if it is verified that the user has a subscription for the application program 12. In other embodiments, the verification of whether the second token matches the first token and the verification of whether the user has a subscription for the application program 12 may be performed simultaneously and/or the verification of whether the second token matches the first token and the verification of whether the user has a subscription for the application program 12 may be independent of each other.

In some embodiments, the verification of whether the user has a subscription for the application program 12 may comprise verifying, with a database operable to store or retrieve subscription data for mobile terminals, whether the user has a subscription for the application program 12. In some embodiments, if the second token matches the first token and the user has a subscription for the application program 12, it can be decided to allow the user access to the application program 12 at block 406. On the other hand, in some embodiments, if the second token does not match the first token and/or the user does not have a subscription for the application program 12, it can be decided to refuse the user access to the application program 12 at block 406.

At block 408, an indication of the decision whether to allow the user access to the application program 12 is transmitted to the device 10.

Although not illustrated in FIG. 8, in some embodiments, the method of operating the node 40 can further comprise receiving a mobile number for the mobile terminal 20 at which the second token is input by the user. In some of these embodiments, the verification of whether the user has a subscription for the application program 12 may be based on the received mobile number for the mobile terminal 20.

Although also not illustrated in FIG. 8, in some embodiments, the method of operating the node 40 may further comprise receiving any one or more of an identity of the application program 12 and an identity of a session running on the application program 12. In embodiments where an identity of a session running on the application program 12 is received, the request from the user may be for access to the session running on the application program 12. In some embodiments, alternatively or in addition to storing the received first token in the database operable to store or retrieve subscription data for mobile terminals, the method of operating the node 40 may comprise storing any one or more of the identity of the application program 12 and the identity of a session running on the application program 12.

Figure 9:
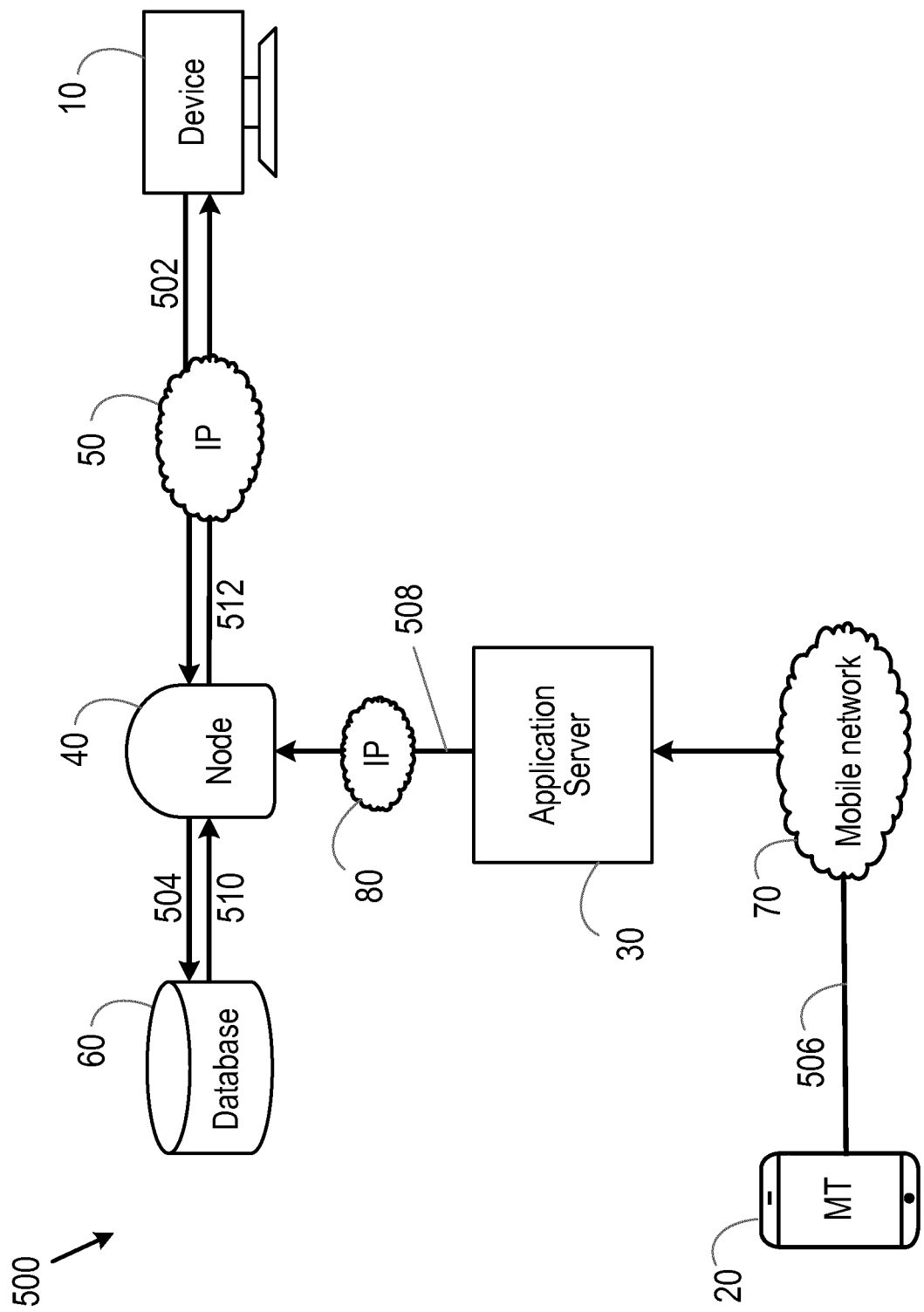
FIG. 9 is a block diagram illustrating an embodiment of a network.

FIG. 9 illustrates a network 500 in accordance with an embodiment. As illustrated in FIG. 9, the network 500 can comprise any one or more of the device 10 having the application program 12 stored therein (as described earlier with reference to FIGS. 1 and 2), the mobile terminal 20 (as described earlier with reference to FIGS. 3 and 4), the mobile network 70 (as mentioned earlier), the application server 30 (as described earlier with reference to FIGS. 5 and 6) and the node 40 (as described earlier with reference to FIGS. 7 and 8). The mobile network 70 referred to herein may be, for example, a mobile access network according to some embodiments.

As mentioned earlier, the node 40 can be provided in an information technology (IT) domain. As also mentioned earlier, the application server 30 can be provided in a mobile network (e.g. in a mobile telephony network) domain. Thus, in some embodiments, the node 40 and the application server 30 can be used to connect the information technology (IT) domain and the mobile network domain.

Figure 10:
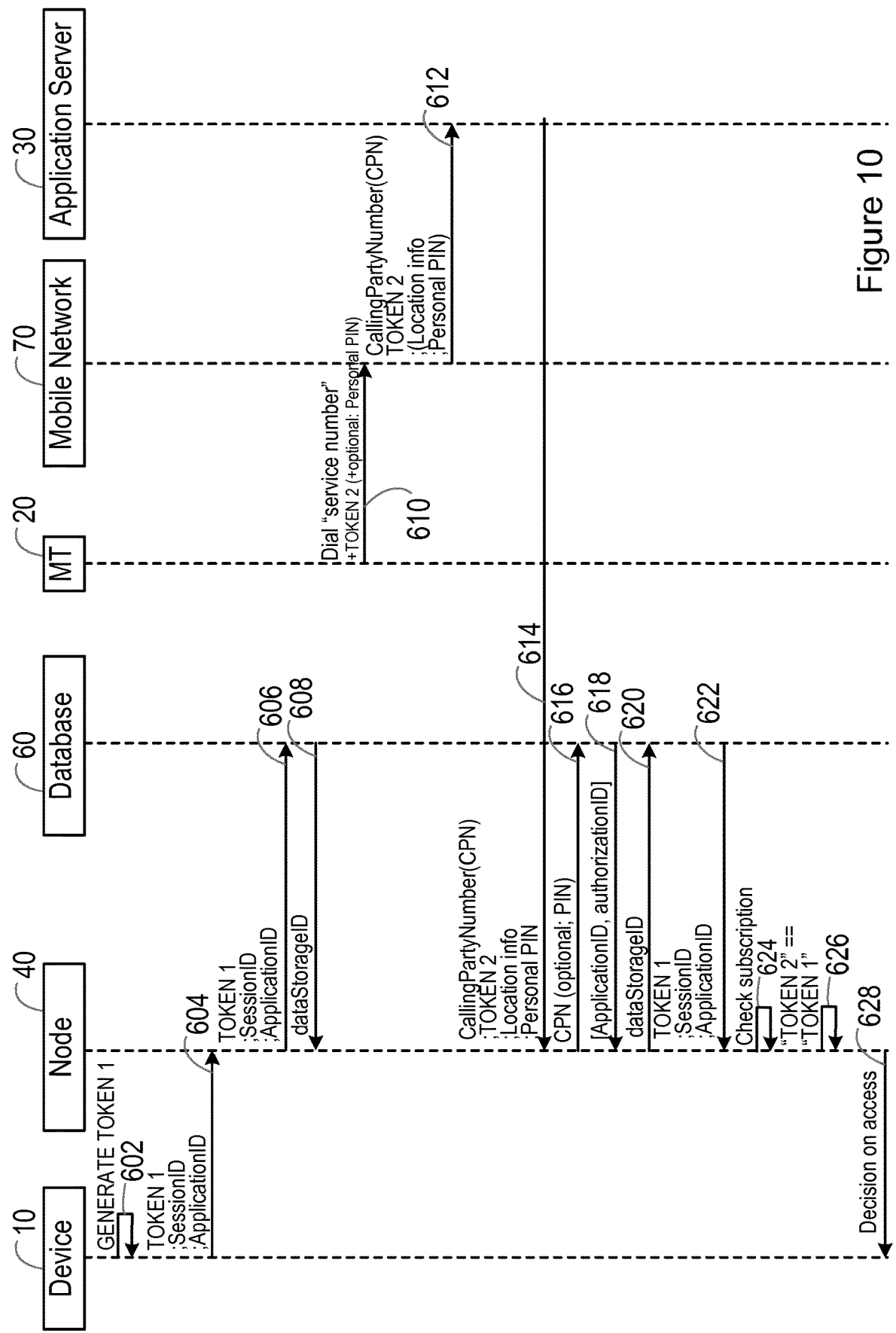
FIG. 10 is a signalling diagram illustrating an exchange of signals in an embodiment of a network.

FIG. 10 is a signalling diagram illustrating an exchange of signals in an embodiment of the network 500. The operation of the network 500 according to an embodiment will now be described with reference to FIGS. 9 and 10.

With reference to FIGS. 9 and 10, as illustrated by arrow 602 of FIG. 10, a first token is generated by the device 10 having the application program 12 stored therein. The first token ("TOKEN 1") is generated by the device 10 in response to a request from a user to access the application program 12. As mentioned earlier, in some embodiments, the first token ("TOKEN 1") may be randomly generated. As illustrated by arrow 502 of FIG. 9 and arrow 604 of FIG. 10, the first token ("TOKEN 1") is transmitted from the device 10 having the application program 12 stored therein to the node 40 of the network 500. The first token ("TOKEN 1") is transmitted for use by the node 40 in deciding whether to allow the user access to the application program 12. As mentioned earlier, in some embodiments, the first token ("TOKEN 1") may be transmitted as a hypertext transfer protocol (HTTP) request.

As illustrated by arrow 604 of FIG. 10, in some embodiments, one or more of an identity of the application program 12 ("ApplicationID") and an identity of a session running on the application program 12 ("SessionID") may also be transmitted from the device 10 to the node 40 of the network 500. The identity of the application program 12 ("ApplicationID") is unique for the application program 12. The identity of a session running on the application program 12 ("SessionID") is unique for the device 10 having the application program 12 stored therein.

As illustrated by the arrow 502 of FIG. 9 and the arrow 604 of FIG. 10, the node 40 of the network 500 receives the first token ("TOKEN 1") from the device 10 having the application program 12 stored therein. In some embodiments, as illustrated by the arrow 604 of FIG. 10, the node 40 of the network 500 may optionally also receive, from the device 10, one or more of an identity of the application program 12 ("ApplicationID") and an identity of a session running on the application program 12 ("SessionID").

According to some embodiments, the network 500 can comprise a first internet protocol (IP) 50. In these embodiments, as illustrated by arrow 502 of FIG. 9, the first token ("TOKEN 1") and optionally also the identity of the application program 12 ("ApplicationID") and/or an identity of a session running on the application program 12 ("SessionID") may be transmitted from the device 10 having the application program 12 to the node 40 via the first IP 50. Thus, in some embodiments, the node 40 may receive the first token ("TOKEN 1") and optionally also the identity of the application program 12 ("ApplicationID") and/or an identity of a session running on the application program 12 ("SessionID") from the device 10 via the first IP 50.

In some embodiments, the network 500 may comprise a database 60 that is operable to store subscription data for mobile terminals and/or that has access to subscription data for mobile terminals, such as via a home subscriber server (HSS). The subscription data can, for example, comprise a list of services with associated authorisation levels for an application program. In some of these embodiments, as illustrated by arrow 504 of FIG. 9 and arrow 606 of FIG. 10, the first token ("TOKEN 1") and optionally also the identity of the application program 12 ("ApplicationID") and/or an identity of a session running on the application program 12 ("SessionID") may be transmitted by the node 40 to the database 60. The database 60 can be operable to store the first token ("TOKEN 1") and optionally also the identity of the application program 12 ("ApplicationID") and/or an identity of a session running on the application program 12 ("SessionID").

In some embodiments, as illustrated by arrow 608 of FIG. 10, the database 60 may provide the node 40 of the network 500 with a data storage identification ("dataStorageID"), which is assigned by the database 60 to the first token ("TOKEN 1") and optionally also the identity of the application program 12 ("ApplicationID") and/or an identity of a session running on the application program 12 ("SessionID"). In this way, the first token ("TOKEN 1") and optionally also the identity of the application program 12 ("ApplicationID") and/or an identity of a session running on the application program 12 ("SessionID") may subsequently be retrieved by the node 40 from the database 60.

At the mobile terminal 20 of the mobile network 70, a second token ("TOKEN 2") input by a user is received. The second token ("TOKEN 2") is input by a user at the mobile terminal 20 in response to a request for the user to input the first token ("TOKEN 1") generated by the device 10 having the application program 12 stored therein. In some embodiments, the second token ("TOKEN 2") may be input by the user at the mobile terminal 20 while a predefined number is being dialled at the mobile terminal 20. For example, the predefined number may be dialled at the mobile terminal 20 followed by input of the second token ("TOKEN 2") at the mobile terminal 20. In some embodiments, the predefined number may be a "service number". Optionally, in some embodiments, a personal identification number (PIN) may also be input at the mobile terminal 20. Alternatively or in addition to the personal identification number (PIN) referred to herein, a mobile station international subscriber directory number (MSISDN) may be used. Alternatively or in addition, in some embodiments, biometric information (e.g. a fingerprint) acquired from a biometric sensor and/or voice recognition performed on an audio signal acquired from an audio sensor may be used. In these ways, security can advantageously be enhanced further.

As illustrated by arrows 506 and 508 of FIG. 9 and arrows 612 and 614 of FIG. 10, the second token ("TOKEN 2") and optionally also the personal identification number (PIN) and/or the mobile station international subscriber directory number (MSISDN) is transmitted from the mobile terminal 20 to the node 40 of the network 500. The second token ("TOKEN 2") and optionally also the personal identification number (PIN) and/or the mobile station international subscriber directory number (MSISDN) is transmitted from the mobile terminal 20 to the node 40 for use in by the node 40 in deciding whether to allow the user access to the application program 12. As illustrated in FIGS. 9 and 10, in some embodiments, the second token ("TOKEN 2") and optionally also the personal identification number (PIN) and/or the mobile station international subscriber directory number (MSISDN) may be transmitted from the mobile terminal 20 to the node 40 of the network 500 via the mobile network 70 and/or the application server 30.

As illustrated in FIG. 9, according to some embodiments, the network 500 can comprise a second internet protocol (IP) 80. In these embodiments, as illustrated by arrow 508 of FIG. 9, the second token ("TOKEN 2") and optionally also the personal identification number (PIN) and/or the mobile station international subscriber directory number (MSISDN) may be transmitted from the mobile terminal 20 to the node 40 of the network 500 via the second IP 80. Thus, in some embodiments, the node 40 of the network 500 may receive the second token ("TOKEN 2") and optionally also the personal identification number (PIN) and/or the mobile station international subscriber directory number (MSISDN) from the mobile terminal 20 via any one or more of the mobile network 70, the application server 30 and the second IP 80.

In embodiments involving the application server 30, as illustrated by arrow 506 of FIG. 9 and arrow 612 of FIG. 10, the application server 30 receives the second token ("TOKEN 2") and optionally also the personal identification number (PIN) input by the user from the mobile terminal 20 (e.g. directly or via the mobile network 70) and/or the mobile station international subscriber directory number (MSISDN). As illustrated by arrow 508 of FIG. 9 and arrow 614 of FIG. 10, the second token and optionally also the personal identification number (PIN) and/or the mobile station international subscriber directory number (MSISDN) is transmitted by the application server 30 to the node 40 of the network 500. The second token and optionally also the personal identification number (PIN) and/or the mobile station international subscriber directory number (MSISDN)

is transmitted to the node 40 for use by the node 40 in deciding whether to allow the user access to the application program 12.

In some embodiments, as illustrated by arrow 612 of FIG. 10, the application server 30 may also receive a mobile number ("CallingPartyNumber" or "CPN") and/or location information for the mobile terminal 20 at which the second token ("TOKEN 2") is input by the user. As illustrated in FIG. 10, the mobile number ("CPN") and/or location information may be received by the application server 30 from the mobile network 70. In some of these embodiments, as illustrated by arrow 614 of FIG. 10, the mobile number ("CPN") and/or location information for the mobile terminal 20 may be transmitted from the application server 30 to the node 40 of the network 500. In some embodiments, the mobile number ("CPN") and/or location information for the mobile terminal 20 can be transmitted to the node 40 for use in the verification of whether the user has a subscription for the application program 12. Thus, in some embodiments, the node 40 of the network 500 also receives the mobile number ("CPN") and/or location information for the mobile terminal 20.

Thus, in this way, the node 40 of the network 500 receives the first token ("TOKEN 1") from the device 10 having the application program 12 stored therein and the second token ("TOKEN 2") input by the user from the mobile terminal 20. At the node 40 of the network 500, it is decided whether to allow the user access to the application program 12 stored in the device 10 based on a verification of whether the second token ("TOKEN 2") matches the first token ("TOKEN 1") and whether the user has a subscription for the application program 12.

In some embodiments, as illustrated by arrow 510 of FIG. 9 and arrow 616 of FIG. 10, the verification of whether the user has a subscription for the application program 12 may comprise verifying, with the database 60 operable to store or retrieve subscription data for mobile terminals, whether the user has a subscription for the application program 12. In embodiments where the node 40 of the network 500 receives the mobile number ("CPN") for the mobile terminal 20, as illustrated by arrow 616 of FIG. 10, the verification of whether the user has a subscription for the application program 12 may be based on the received mobile number ("CPN") for the mobile terminal 20. Alternatively or in addition, in embodiments where the node 40 of the network 500 receives the personal identification number (PIN) and/or the mobile station international subscriber directory number (MSISDN), as illustrated by arrow 616 of FIG. 10, the verification of whether the user has a subscription for the application program 12 may be based on the received personal identification number (PIN) and/or the mobile station international subscriber directory number (MSISDN).

In some embodiments, as illustrated by arrow 618 of FIG. 10, the node 40 of the network 500 can be operable to retrieve verification of whether the user has a subscription for the application program 12 from the database 60. For example, in some embodiments, the node 40 of the network 500 may be operable to retrieve, from the database 60, an indication of which application programs the user is allowed to access, such as by retrieving an indication of an identity of those application programs ("Application ID"). In some embodiments, the node 40 may also be operable to retrieve, from the database 60, an indication of an authority (or level of authority) with which the user can access the application programs ("authorizationID"). The authority may, for example, be an authority to read data, an authority to read and write data, an authority of an administrator, an authority of a guest user, or any other authority.

In some embodiments, as illustrated by arrow 620 of FIG. 10, the node 40 of the network 500 may query the database 60 using the previously received data storage identification ("dataStorageID") assigned by the database 60 to the first token ("TOKEN 1"). In this way, as illustrated by arrow 622 of FIG. 10, the node 40 can retrieve the first token ("TOKEN 1") and optionally also the identity of the application program 12 ("ApplicationID") and/or an identity of a session running on the application program 12 ("SessionID") from the database 60. In this way, the node 40 does not itself need to store this information but can retrieve it from the database 60 for use in the verification of verification of whether the second token ("TOKEN 2") matches the first token ("TOKEN 1") and whether the user has a subscription for the application program 12.

Thus, as illustrated by arrows 624 and 626 of FIG. 10, it is decided at the node 40 of the network 500 whether to allow the user access to the application program 12 stored in the device 10 based on a verification of whether the second token ("TOKEN 2") matches the first token ("TOKEN 1") and whether the user has a subscription for the application program 12. For example, if the second token ("TOKEN 2") matches the first token ("TOKEN 1") and the user has a subscription for the application program 12, it can be decided to allow the user access to the application program 12. In some embodiments, the second token ("TOKEN 2") matches the first token ("TOKEN 1") where the tokens are the same or equal (i.e. where "TOKEN 2"=="TOKEN 1"). On the other hand, if the second token ("TOKEN 2") does not match the first token ("TOKEN 1") and/or the user does not have a subscription for the application program 12, it can be decided to refuse the user access to the application program 12. In some embodiments, the second token ("TOKEN 2") does not match the first token ("TOKEN 1") where the tokens are different or not equal (i.e. where "TOKEN 2"≠"TOKEN 1").

As illustrated by arrow 512 of FIG. 9 and arrow 628 of FIG. 10, an indication of the decision whether to allow the user access to the application program 12 is transmitted from the node 40 of the network 500 to the device 10. As illustrated in FIG. 9, in embodiments where the network 500 comprises the first IP 50, the indication of the decision may be transmitted from the node 40 of the network 500 to the device 10 via the first IP 50. Thus, the indication of the decision whether to allow the user access to the application program 12 is received at the device 10 from the node 40 of the network 500. If the indication is an indication of a decision to allow the user access to the application program 12, the device 10 may be operable to allow the user access to the application program 12. On the other hand, if the indication is an indication of a decision to refuse the user access to the application program 12, the device 10 may be operable to refuse the user access to the application program 12.

Figure 11:
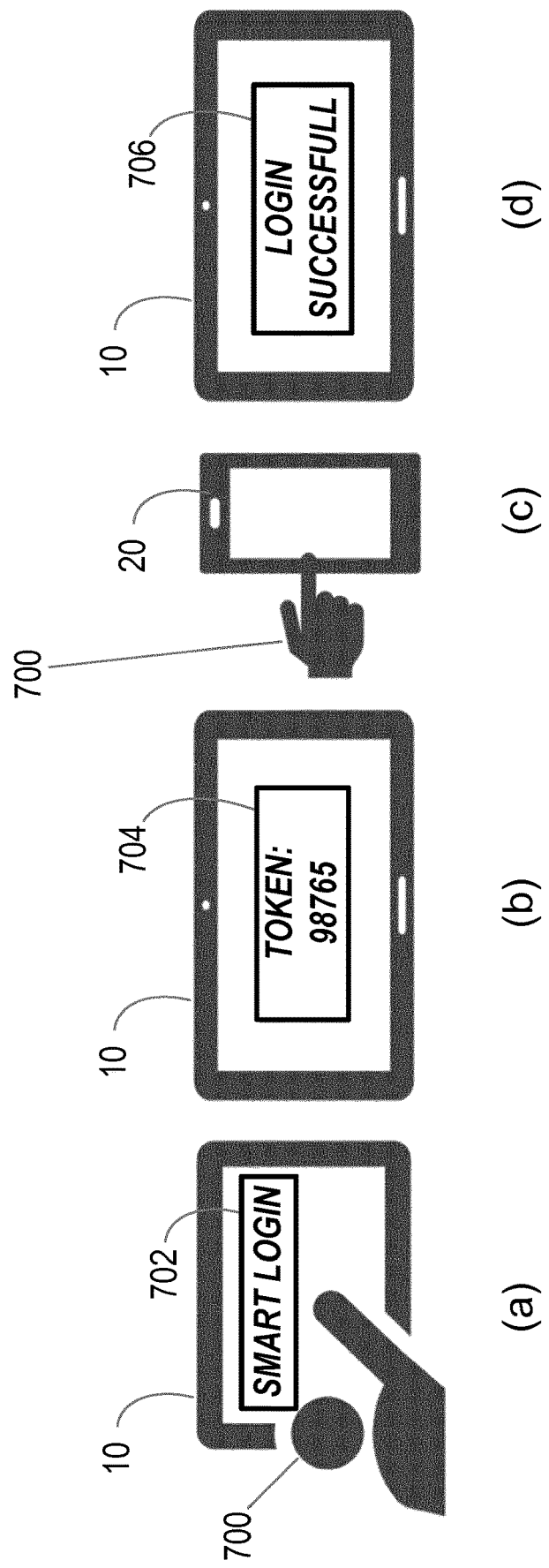
FIG. 11 is a block diagram illustrating a device and a mobile terminal in use in accordance with an embodiment.

FIG. 11 is a block diagram illustrating a device 10 having an application program 12 stored therein and a mobile terminal 20 in use by a user 700 in accordance with an embodiment. The device 10 having the application program 12 stored therein and the mobile terminal 20 operate in the manner described earlier. FIG. 11 will now be described from the perspective of the user 700.

As illustrated in FIG. 11(a), at the device 10 having the application program 12 stored therein, the user 700 requests access to the application program 12. In this illustrated embodiment, the user requests access to the application program 12 via a user interface of the device 10 or, more specifically, via a "smart login" option 702 displayed on the user interface of the device 10. For example, in some embodiments, the user interface of the device 10 may be a touch screen and the user can select the "smart login" option 702 by touching the option on the screen. In other embodiments, the user interface of the device 10 may be a display and the user can select the "smart login" option 702 by clicking on the option on the display (e.g. using a keypad, mouse, or similar). In other embodiments, the "smart login" option 702 may be provided as a button that the user can press.

Once the user requests access to the application program 12, as illustrated in FIG. 11(b), a first token is generated by the device 10 having the application program 12 stored therein in response to the request from the user 700 to access the application program 12. The first token (and optionally also the SessionID and/or ApplicationID) is transmitted from the device 10 to the node 40 of the network 500 in the manner described earlier. In this illustrated embodiment, the first token is a code comprising a plurality of digits ("98765"). The plurality of digits may be randomly generated by the device 10. As illustrated in FIG. 11(b), in this illustrated embodiment, the first token is displayed to the user on the user interface of the device 10 having the application program 12 stored therein.

At the mobile terminal 20 of the mobile network 70, the user is requested to input the first token generated by the device 10 having the application program 12 stored therein. As illustrated in FIG. 9(c), the user 700 inputs a second token at the mobile terminal 20 in response to the request for the user 700 to input the first token. In some embodiments, the user may directly input the second token at a user interface (e.g. using a keypad or a touch screen) of the mobile terminal 20. In other embodiments, the user may initially dial a predefined number at the mobile terminal 20 and then input the second token while dialling the predefined number. For example, the user 700 may input the second token directly after dialling the predefined number or the user 700 may input the second token after being requested during a call to the predefined number to input the first token generated by the device 10. In these embodiments, the user 700 may input the second token at a user interface (e.g. using a keypad or a touch screen) of the mobile terminal 20. In other embodiments, the user 700 may input the second token at a mobile application running on the mobile terminal 20, via a QR code, via an interactive voice response (IVR), or any other input mechanism. Optionally, in some embodiments, the user may also input a personal identification number (PIN), which can provide additional security. The second token input by the user at the mobile terminal 20 (and optionally also a PIN, CPN and/or MSISDN) is transmitted to the node 40 in the manner described earlier.

Once the node 40 receives the first token and the second token, the node 40 operates in the manner described earlier to decide whether to allow the user access to the application program 12 stored in the device 10 and to transmit an indication of the decision to the device 10.

As illustrated in FIG. 9(d), an indication 706 of the decision whether to allow the user access to the application program 12 is displayed to the user at the device 10 having the application program 12 stored therein. More specifically, in this illustrated embodiment, an indication 706 of a decision to allow the user access to the application program 12 (via the words "login successful") is displayed to the user at the device 10. Thus, in this illustrated embodiment, the user 700 provides the correct data at the mobile terminal 20 and the user has a subscription for the application program 12. As such, the user is logged in to the application program 12 at the device 10.

Figure 12:
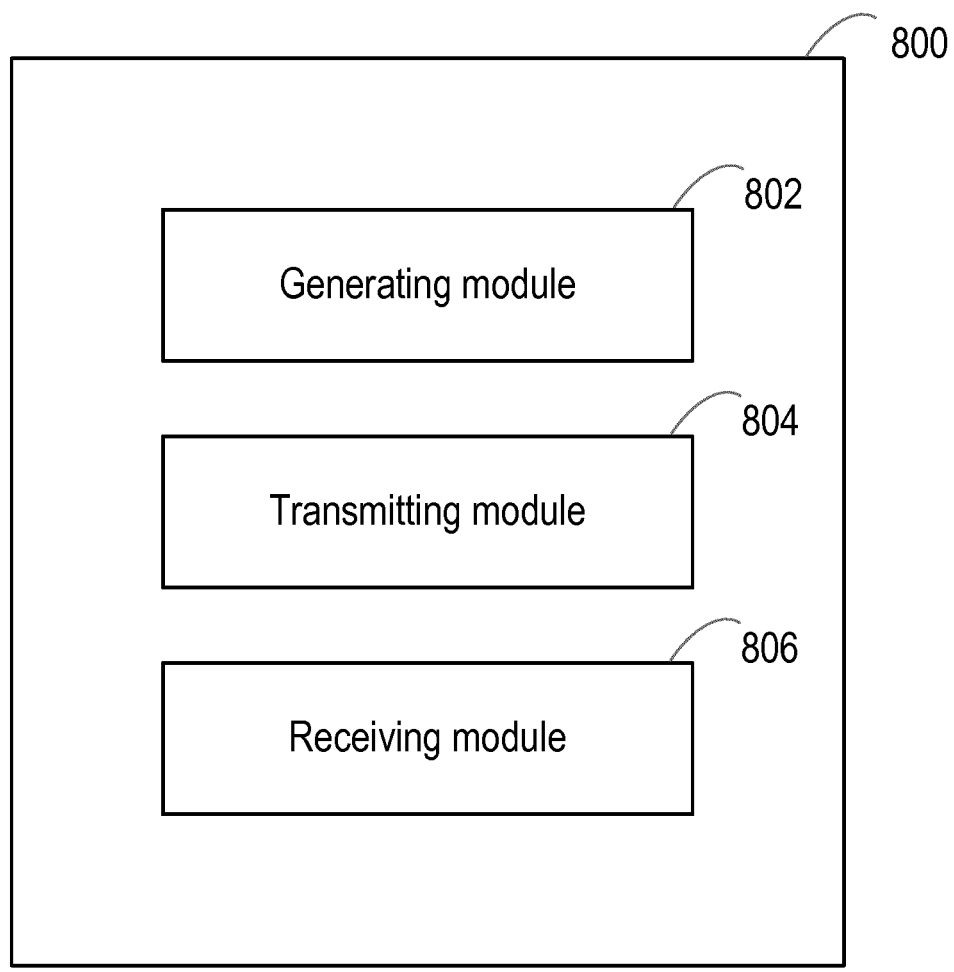
FIG. 12 is a block diagram illustrating an embodiment of a device.

FIG. 12 is a block diagram illustrating a device 800 having an application program stored therein. The device 800 comprises a generating module 802 configured to generate a first token in response to a request from a user to access the application program and a transmitting module 804 configured to transmit the first token to a node of a network for use by the node in deciding whether to allow the user access to the application program. The device 800 also comprises a receiving module 806 configured to receive, from the node, an indication of the decision whether to allow the user access to the application program.

Figure 13:
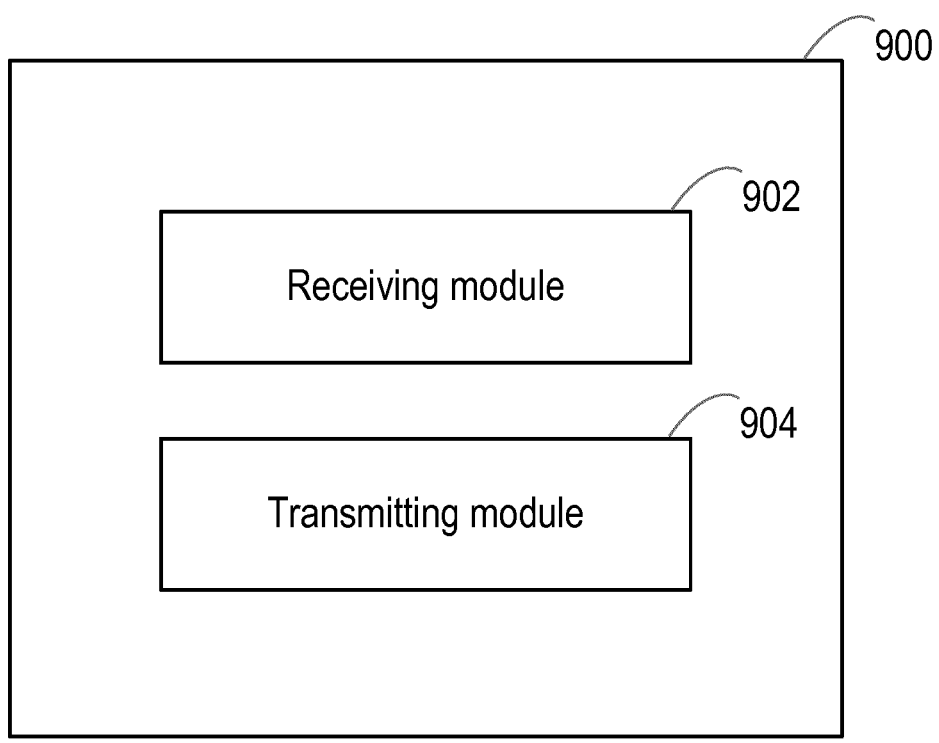
FIG. 13 is a block diagram illustrating an embodiment of a mobile terminal.

FIG. 13 is a block diagram illustrating a mobile network 900. The mobile terminal 900 comprises a receiving module 902 configured to receive a second token input by a user at the mobile terminal in response to a request for the user to input a first token generated by a device having an application program stored therein. The mobile terminal 900 also comprises a transmitting module 904 configured to transmit the received second token to a node of a network for use by the node in deciding whether to allow the user access to the application program.

Figure 14:
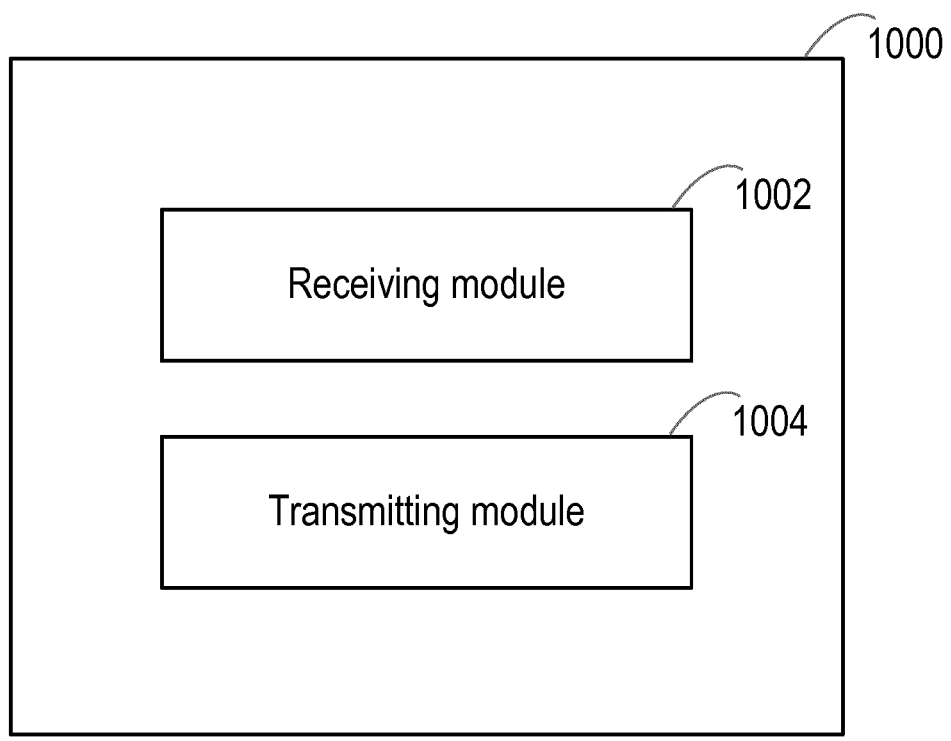
FIG. 14 is a block diagram illustrating an embodiment of an application server.

FIG. 14 is a block diagram illustrating an application server 1000 of a network. The application server comprises a receiving module 1002 configured to receive, from a mobile terminal of a mobile network, a second token input by a user at the mobile terminal. The second token is input by the user in response to a request for the user to input a first token generated by a device having an application program stored therein. The application server 1000 also comprises a transmitting module 1004 configured to transmit the second token to a node of a network for use by the node in deciding whether to allow the user access to the application program.

Figure 15:
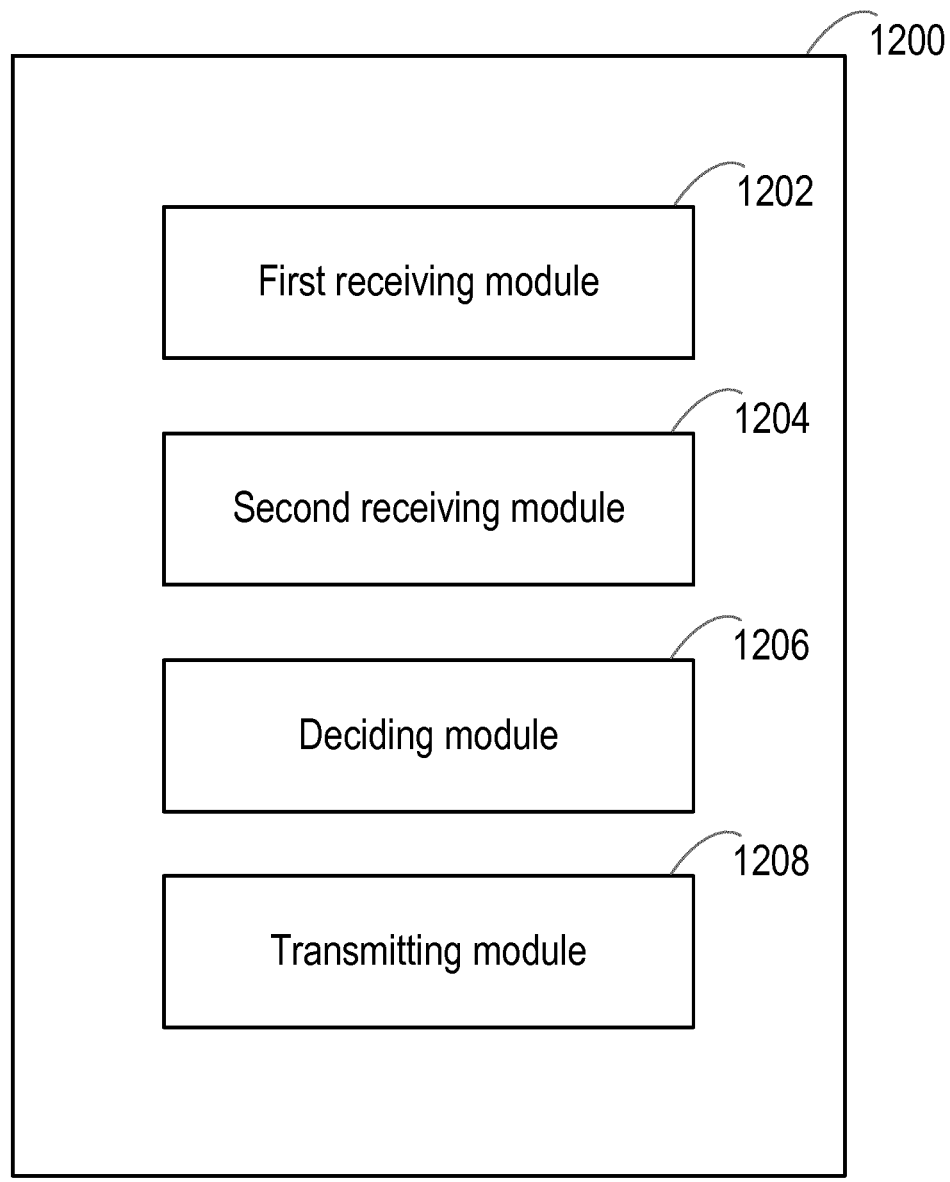
FIG. 15 is a block diagram illustrating an embodiment of a node.

FIG. 15 is a block diagram illustrating a node 1200 of a network. The node 1200 comprises a first receiving module 1202 configured to receive, from a device having an application program stored therein, a first token generated by the device in response to a request from a user to access the application program. The node 1200 further comprises a second receiving module 1204 configured to receive a second token input by the user at a mobile terminal of a mobile network in response to a request for the user to input the first token generated by the device. The node 1200 also comprises a deciding module 1206 configured to decide whether to allow the user access to the application program stored in the device based on a verification of whether the second token matches the first token and whether the user has a subscription for the application program. The node 1200 further comprises a transmitting module 1208 configured to transmit, to the device, an indication of the decision whether to allow the user access to the application program.

There is also provided a computer program product comprising a carrier containing instructions for causing processing circuitry to perform at least part of the method described herein. In some embodiments, the carrier can be any one of an electronic signal, an optical signal, an electromagnetic signal, an electrical signal, a radio signal, a microwave signal, or a computer-readable storage medium. In some embodiments, the computer-readable storage medium may be operable to store a computer program, software, an application including one or more of logic, rules, code, tables, etc. and/or other instructions capable of being executed by the processing circuitry described herein.

There is thus advantageously provided herein an improved way in which to allow access to an application program.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of operating a node of a network, the method comprising:
   receiving, from a device having an application program stored therein, a first token generated by the device in response to a request from a user to access the application program;
   receiving a second token input by the user at a mobile terminal of a mobile network in response to a request for the user to input the first token generated by the device;
   deciding whether to allow the user access to the application program stored in the device based on a verification of whether the second token matches the first token and whether the user has a subscription for the application program; and
   transmitting, to the device, an indication of the decision whether to allow the user access to the application program.

2. The method as claimed in claim 1, wherein at least one of:
   if the second token matches the first token and the user has a subscription for the application program, deciding to allow the user access to the application program; and
   if at least one of the second token does not match the first token and the user does not have a subscription for the application program, deciding to refuse the user access to the application program.

3. The method as claimed in claim 1, wherein the verification of whether the user has a subscription for the application program comprises:
   verifying, with a database operable to one of store and retrieve subscription data for mobile terminals, whether the user has a subscription for the application program.

4. The method as claimed in claim 1, wherein the method further comprises:
   receiving a mobile number for the mobile terminal at which the second token is input by the user.

5. The method as claimed in claim 4, wherein the verification of whether the user has a subscription for the application program is based on the received mobile number for the mobile terminal.

6. The method as claimed in claim 1, wherein the method further comprises:
   receiving any one or more of:
      an identity of the application program; and
      an identity of a session running on the application program, wherein the request from the user is for access to the session running on the application program.

7. The method as claimed in claim 6, wherein the method further comprises:
   storing, in a database operable to one of store and retrieve subscription data for mobile terminals, any one or more of the first token, the identity of the application program and the identity of a session running on the application program.

8. The method as claimed in claim 1, wherein the second token is received via at least one of the mobile network and an application server.

9. The method as claimed in claim 1, wherein the second token is input by the user at the mobile terminal while a predefined number is dialed at the mobile terminal.

10. The method as claimed in claim 1, wherein the first token is received as a hypertext transfer protocol request.

11. The method as claimed in claim 1, wherein the first token is randomly generated by the device.

12. The method as claimed in claim 2, wherein the verification of whether the user has a subscription for the application program comprises:
    verifying, with a database operable to one of store and retrieve subscription data for mobile terminals, whether the user has a subscription for the application program.

13. The method as claimed in claim 2, wherein the method further comprises:
    receiving a mobile number for the mobile terminal at which the second token is input by the user.

14. The method as claimed in claim 13, wherein the verification of whether the user has a subscription for the application program is based on the received mobile number for the mobile terminal.

15. The method as claimed in claim 2, wherein the method further comprises:
    receiving any one or more of:
       an identity of the application program; and
       an identity of a session running on the application program, wherein the request from the user is for access to the session running on the application program.

16. A node of a network, the node comprising:
    processing circuitry configured to:
       receive, from a device having an application program stored therein, a first token generated by the device in response to a request from a user to access the application program;
       receive a second token input by the user at a mobile terminal of a mobile network in response to a request for the user to input the first token generated by the device;
       decide whether to allow the user access to the application program stored in the device based on a verification of whether the second token matches the first token and whether the user has a subscription for the application program; and
       transmit, to the device, an indication of the decision whether to allow the user access to the application program.

17. A method of operating a mobile terminal of a mobile network, the method comprising:
    receiving a second token input by a user at the mobile terminal in response to a request for the user to input a first token generated by a device having an application program stored therein; and
    transmitting the received second token to a node of a network, the first token and second token being for use in by the node in deciding whether to allow the user access to the application program that is stored in the device.

18. The method as claimed in claim 17, wherein the second token is input by the user at the mobile terminal while a predefined number is being dialed at the mobile terminal.

19. The method as claimed in claim 17, wherein the method comprises:
   transmitting the received second token to the node of the network via one of the mobile network and an application server.

20. A mobile terminal of a mobile network, the mobile terminal comprising:
   processing circuitry configured to:
      receive a second token input by a user at the mobile terminal in response to a request for the user to input a first token generated by a device having an application program stored therein; and
      transmit the received second token to a node of a network, the first token and second token being for use by the node in deciding whether to allow the user access to the application program that is stored in the device.

* * * * *